United States Patent
Evans et al.

(10) Patent No.: US 9,922,220 B2
(45) Date of Patent: Mar. 20, 2018

(54) IMAGE BLOCK SELECTION FOR EFFICIENT TIME-LIMITED DECODING

(71) Applicant: Digimarc Corporation, Beaverton, OR (US)

(72) Inventors: Eric D. Evans, Portland, OR (US); Tomas Filler, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/176,498

(22) Filed: Jun. 8, 2016

(65) Prior Publication Data

US 2016/0364623 A1    Dec. 15, 2016

Related U.S. Application Data

(60) Provisional application No. 62/174,454, filed on Jun. 11, 2015.

(51) Int. Cl.
    *G06K 9/00*      (2006.01)
    *G06K 7/10*      (2006.01)
    (Continued)

(52) U.S. Cl.
    CPC ......... *G06K 7/10722* (2013.01); *G06K 7/146* (2013.01); *G06K 9/18* (2013.01);
    (Continued)

(58) Field of Classification Search
    CPC ........... H04N 19/61; H04N 2201/3271; H04N 19/85; H04N 19/90; H04N 1/00326;
    (Continued)

(56) References Cited

U.S. PATENT DOCUMENTS 5,822,436 A    10/1998    Rhoads
6,590,996 B1    7/2003    Reed et al.
(Continued)

OTHER PUBLICATIONS

Feige, A threshold of 1n n for approximating set cover, Journal of the ACM, Jul. 1, 1998, pp. 634-652.
(Continued)

*Primary Examiner* — Aklilu Woldemariam
(74) *Attorney, Agent, or Firm* — Digimarc Corporation

(57) ABSTRACT

Object recognition by point-of-sale camera systems is aided by first removing perspective distortion. Yet pose of the object—relative to the system—depends on actions of the operator, and is usually unknown. Multiple trial counter-distortions to remove perspective distortion can be attempted, but the number of such trials is limited by the frame rate of the camera system—which limits the available processing interval. One embodiment of the present technology examines historical image data to determine counter-distortions that statistically yield best object recognition results. Similarly, the system can analyze historical data to learn what sub-parts of captured imagery most likely enable object recognition. A set-cover strategy is desirably used. In some arrangements, the system identifies different counter-distortions, and image sub-parts, that work best with different clerk- and customer-operators of the system, and processes captured imagery accordingly. A great variety of other features and arrangements are also detailed.

8 Claims, 9 Drawing Sheets

(51) Int. Cl.

| | |
|---|---|
| *G06T 5/00* | (2006.01) |
| *G06K 7/14* | (2006.01) |
| *G06T 3/00* | (2006.01) |
| *G06K 9/18* | (2006.01) |
| *G06K 9/36* | (2006.01) |
| *G06K 9/62* | (2006.01) |
| *G06K 9/46* | (2006.01) |

(52) U.S. Cl.
CPC ............ *G06K 9/36* (2013.01); *G06K 9/6262* (2013.01); *G06T 3/00* (2013.01); *G06T 5/002* (2013.01); *G06K 9/00* (2013.01); *G06K 9/4676* (2013.01); *G06K 2009/363* (2013.01)

(58) Field of Classification Search
CPC ....... H04N 1/00334; H04N 2201/3269; H04N 19/00; H04N 19/103; H04N 19/154; H04N 19/162; H04N 19/17; H04N 19/192; H04N 19/20; A63F 13/211; A63F 13/213; A63F 13/42; A63F 13/428; A63F 2300/1093; G06F 3/011; G06F 3/012; G06F 3/013; G06F 3/017; G06F 3/0346; G06F 3/038; G06F 3/0304; G06F 3/015; G06F 3/04815; G06F 3/0485; G06F 2203/04806; G06F 3/04847; G06F 3/04842; G06F 3/0488; G06F 9/50; G06F 3/005; G06F 3/023; G06F 3/04817; G06F 3/0482; G06F 3/04886; G06K 9/00335; G06K 9/00355; G06K 19/06028; G06K 19/06037; G06K 19/06046; G06K 19/06056; G06K 7/1434; G06K 7/1413; G06K 9/6202; G06K 9/00671; G06T 7/20; G07G 1/0054; G07G 3/003; G08B 13/242; G08B 13/246
USPC ........ 382/103, 189, 309, 310, 311; 345/156, 345/158
See application file for complete search history.

(56) References Cited

U.S. PATENT DOCUMENTS

| | | | |
|---|---|---|---|
| 6,674,919 B1 * | 1/2004 | Ma ......................... | G06K 7/14 382/199 |
| 6,952,485 B1 | 10/2005 | Davidson et al. | |
| 7,013,021 B2 | 3/2006 | Sharma et al. | |
| 7,672,474 B2 | 3/2010 | Nakamura et al. | |
| 7,689,054 B1 * | 3/2010 | Repperger ........... | G06K 9/3241 382/162 |
| 8,745,541 B2 * | 6/2014 | Wilson .................... | G06F 3/017 345/156 |
| 9,118,771 B2 * | 8/2015 | Rodriguez ............. | G01C 21/20 |
| 9,189,673 B2 | 11/2015 | Decoux | |
| 9,635,378 B2 | 4/2017 | Holub et al. | |
| 9,747,656 B2 | 8/2017 | Stach et al. | |
| 2005/0061878 A1 * | 3/2005 | Barenburg ........... | G06K 7/1434 235/385 |
| 2005/0175180 A1 | 8/2005 | Venkatesan et al. | |
| 2006/0067593 A1 * | 3/2006 | Erol ................... | H04N 1/00283 382/309 |
| 2006/0070006 A1 * | 3/2006 | Erol ................... | H04N 1/00326 715/764 |
| 2006/0072165 A1 * | 4/2006 | Erol ................... | H04N 1/00326 358/426.12 |
| 2007/0257934 A1 * | 11/2007 | Doermann ............... | G06K 9/36 345/606 |
| 2008/0240019 A1 | 10/2008 | Bejerano et al. | |
| 2010/0103463 A1 * | 4/2010 | Joshi .................. | H04N 1/00326 358/1.16 |
| 2010/0150434 A1 | 6/2010 | Reed | |
| 2011/0161076 A1 * | 6/2011 | Davis .................. | G06F 3/04842 704/231 |
| 2011/0211517 A1 | 9/2011 | Moscibroda et al. | |
| 2012/0078989 A1 | 3/2012 | Sharma et al. | |
| 2013/0019216 A1 | 1/2013 | Vasudevan et al. | |
| 2013/0223673 A1 | 8/2013 | Davis et al. | |
| 2013/0278425 A1 * | 10/2013 | Cunningham ....... | G08B 13/246 340/572.1 |
| 2014/0052555 A1 | 2/2014 | Macintosh | |
| 2014/0063197 A1 * | 3/2014 | Yamamoto ............. | G08G 1/166 348/46 |
| 2014/0112524 A1 | 4/2014 | Bai et al. | |
| 2014/0119593 A1 | 5/2014 | Filler | |
| 2015/0016712 A1 | 1/2015 | Rhoads et al. | |

OTHER PUBLICATIONS

Set Cover article from Wikipedia archive, dated Jun. 3, 2015.
Stern, Set Cover Problem, Seminar in Theoretical Computer Science, MIT, Feb. 9, 2006.
Japanese patent document JP2005026797, with machine translation.

* cited by examiner

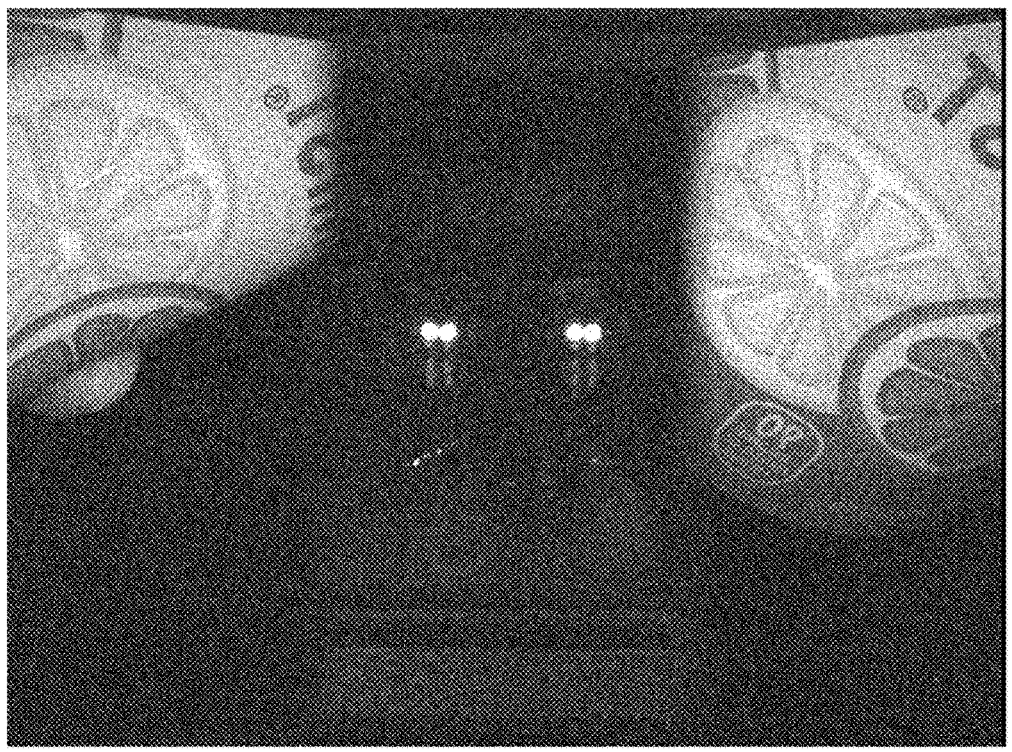
FIG. 4
FIG. 5

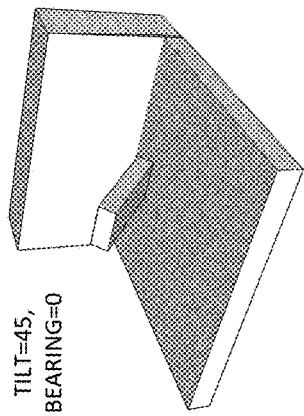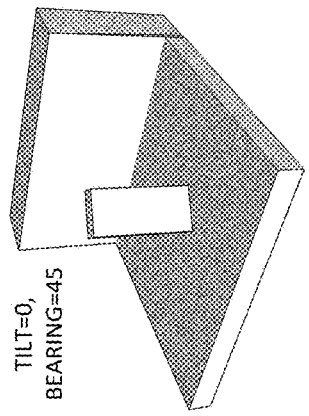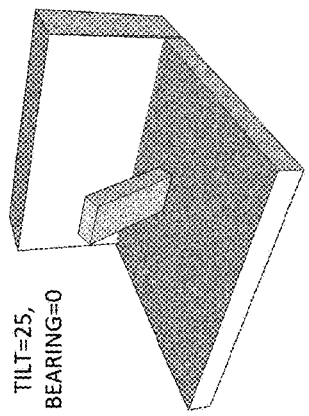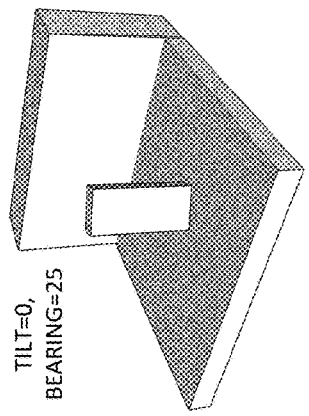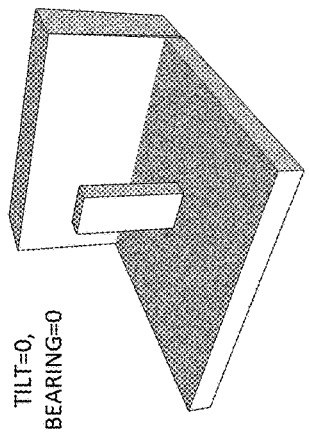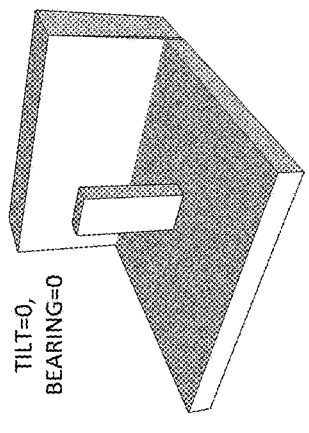

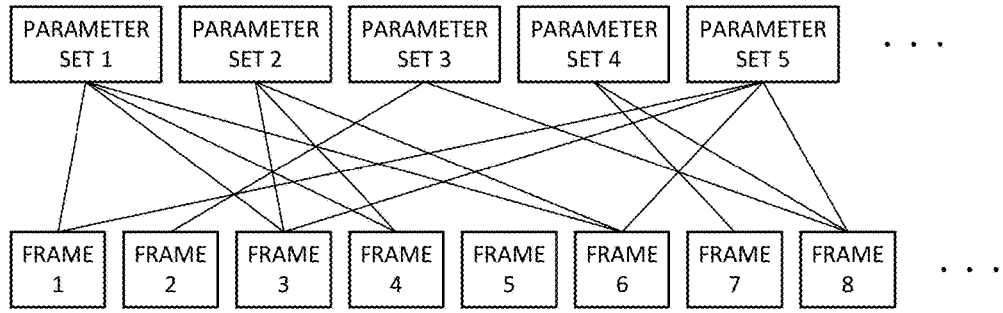

| PARAMETER SET | \\ IMAGE FRAMES \\ | | | | | | | | | TOTAL |
|---|---|---|---|---|---|---|---|---|---|---|
| | 1 | 2 | 3 | 4 | 5 | 6 | 7 | 8 | ... | |
| 1 | X | | X | X | | X | | | ... | - |
| 2 | | | X | X | | X | | | ... | 0 |
| 3 | | X | | | | | | X | ... | 2 |
| 4 | | | | | | | X | X | ... | 2 |
| 5 | X | | X | | | X | | X | ... | 1 |

FIG. 13A — NEEDED FRAMES AFTER PARAMETER SET 1 APPLIED

| PARAMETER SET | IMAGE FRAMES | | | | | | | | | TOTAL |
|---|---|---|---|---|---|---|---|---|---|---|
| | 1 | 2 | 3 | 4 | 5 | 6 | 7 | 8 | ... | |
| 1 | X | | X | X | | X | | | ... | - |
| 2 | | | X | X | | X | | | ... | 0 |
| 3 | | X | | | | | | X | ... | - |
| 4 | | | | | | | X | X | ... | 1 |
| 5 | X | | X | | | X | | X | ... | 0 |

FIG. 13B — NEEDED FRAMES AFTER PARAMETER SETS 1 AND 3 APPLIED

| PARAMETER SET | IMAGE FRAMES | | | | | | | | | TOTAL |
|---|---|---|---|---|---|---|---|---|---|---|
| | 1 | 2 | 3 | 4 | 5 | 6 | 7 | 8 | ... | |
| 1 | X | | X | X | | X | | | ... | - |
| 2 | | | X | X | | X | | | ... | 0 |
| 3 | | X | | | | | | X | ... | - |
| 4 | | | | | | | X | X | ... | - |
| 5 | X | | X | | | X | | X | ... | 0 |

FIG. 13C — NEEDED FRAMES AFTER PARAMETER SETS 1, 3 AND 4 APPLIED

| PARAMETER SET | IMAGE FRAMES | | | | | | | | | TOTAL |
|---|---|---|---|---|---|---|---|---|---|---|
| | 1 | 2 | 3 | 4 | 5 | 6 | 7 | 8 | ... | |
| 1 | X | | X | X | | X | | | ... | 4 |
| 3 | | X | | | | | | X | ... | 2 |
| 4 | | | | | | | X | X | ... | 2 |
| COMBINED | X | X | X | X | | X | X | X | ... | 7 |

FIG. 13D — AFTER PARAMETER SETS 1, 3 AND 4 APPLIED ← 7 FRAMES DECODED

TOWER

| Detected Frames | Excerpt Location | Tilt | Bearing |
|---|---|---|---|
| 87 | 576,220 | 40 | 270 |
| 62 | 64,224 | 10 | 180 |
| 26 | 64,224 | -33.5 | 270 |
| 19 | 576,220 | 40 | 270 |
| 17 | 576,220 | 20 | 45 |
| 14 | 576,124 | 50 | 315 |
| 12 | 576,300 | 20 | 135 |
| 11 | 576,300 | 0 | 45 |
| 9 | 64,128 | 20 | 90 |

FIG. 14A

PLATTER

| Detected Frames | Excerpt Location | Tilt | Bearing |
|---|---|---|---|
| 40 | 64,192 | 40 | 270 |
| 33 | 576,360 | -45.33 | 263.32 |
| 29 | 576,360 | 40 | 270 |
| 23 | 64,288 | 10 | 135 |
| 19 | 320,64 | -51.87 | -6.06 |
| 17 | 64,288 | 50 | 90 |
| 14 | 320,64 | 40 | 45 |
| 12 | 64,288 | 30 | 81.5 |
| 10 | 576,264 | 20 | 90 |

FIG. 14B

TOWER

| Detected Frames | Excerpt Location | Tilt | Bearing | Flip? | Scale | Camera Model Correction Parameters |
|---|---|---|---|---|---|---|
| 87 | 576,220 | 40 | 270 | Yes | 2 | 2895.93,2923.17,390.809,536.479 |
| 62 | 64,224 | 10 | 180 | Yes | 2 | 2935.54,3097.41,693.46,892.4 |
| 26 | 64,224 | -33.5 | 270 | Yes | 2 | 2895.93,2923.17,390.809,536.479 |
| 19 | 576,220 | 40 | 270 | Yes | 2 | 2935.54,3097.41,693.46,892.4 |
| 17 | 576,220 | 20 | 45 | Yes | 2 | 3121.19,3131.92,211.861,383.054 |
| 14 | 576,124 | 50 | 315 | Yes | 2 | 2895.93,2923.17,390.809,536.479 |
| 12 | 576,300 | 20 | 135 | Yes | 2 | 2895.93,2923.17,390.809,536.479 |
| 11 | 576,300 | 0 | 45 | Yes | 2 | 3121.19,3131.92,211.861,383.054 |
| 9 | 64,128 | 20 | 90 | Yes | 2 | 2935.54,3097.41,693.46,892.4 |

FIG. 15A

PLATTER

| Detected Frames | Excerpt Location | Tilt | Bearing | Flip? | Scale | Camera Model Correction Parameters |
|---|---|---|---|---|---|---|
| 40 | 64,192 | 40 | 270 | Yes | 2 | 3346.57,3216.42,988.878,-129.025 |
| 33 | 576,360 | -45.33 | 263.32 | Yes | 2 | 3346.57,3216.42,988.878,-129.025 |
| 29 | 576,360 | 40 | 270 | Yes | 2 | 3711.05,3511.510.524,1163.95 |
| 23 | 64,288 | 10 | 135 | Yes | 2 | 3711.05,3511.510.524,1163.95 |
| 19 | 320,64 | -51.87 | -6.06 | No | 2 | 3414.91,3478.66,1092.91,645.368 |
| 17 | 64,288 | 50 | 90 | Yes | 2 | 3711.05,3511.510.524,1163.95 |
| 14 | 320,64 | 40 | 45 | No | 2 | 3414.91,3478.66,1092.91,645.368 |
| 12 | 64,288 | 30 | 81.5 | Yes | 2 | 3711.05,3511.510.524,1163.95 |
| 10 | 576,264 | 20 | 90 | Yes | 2 | 3711.05,3511.510.524,1163.95 |

FIG. 15B

IMAGE BLOCK SELECTION FOR EFFICIENT TIME-LIMITED DECODING

RELATED APPLICATION DATA

This application claims priority to provisional patent application 62/174,454, filed Jun. 11, 2015, the disclosure of which is incorporated herein by reference.

BACKGROUND AND SUMMARY

Camera-based retail scanning systems commonly capture between 30 and 100 frames of imagery every second. If real-time operation is to be achieved, such systems can only allocate a short interval to process each image. For example, if a system captures 60 frames each second, it can devote a maximum of 16.6 milliseconds to each image.

This time constraint is a particular challenge because product-identifying indicia (e.g., a barcode or watermark data) may appear anywhere in the captured frames. Moreover, each captured image is commonly a synthesis of several different images—captured from different viewpoints by an optical arrangement including multiple mirrors. Searching the full extent of such a composite image in search of a decodable indicia is typically too time consuming. It is generally preferable to examine a limited number of image excerpts.

Yet another complication is that the pose at which any indicia is captured is unknown. The indicia may be unrecognizable due to the perspective distortion introduced by the pose. A variety of brute-force compensations can be applied to try and counter-act possible distortions to improve detection, but only a limited number of such compensations can be tried in the limited period available.

If nine image excerpts are examined from each image, and 50 different perspective corrections are trialed for each, then there are 450 different perspectively-transformed image excerpts to prepare, and attempt to decode, every 16 milliseconds. This is beyond the capabilities of the processing hardware commonly provided in retail scanners, and associated point of sale terminals.

In accordance with one aspect of the present technology, an ordered listing of processing parameters is prepared. Each entry includes a particular location from which an image excerpt may be taken, and a particular set of geometrical correction factors that should applied to that excerpt prior to decoding. A processor receives an input image and tries decoding the first-specified excerpt after applying the first-specified correction factors. If time remains, the processor tries decoding the second-specified excerpt after applying the second-specified correction factors. The process continues down the ordered listing, with the processor making repeated attempts to decode indicia from the input image until the available time runs out. At that point, any decoded indicia data is output by the processor to an associated point of sale terminal, and the process begins anew with the next frame of captured imagery.

The ordered listing of processing parameters can be derived from reference scanner images that are analyzed exhaustively. In an illustrative embodiment, imagery captured during normal operation of the scanner by a checkout clerk is processed. A thousand images may be used—selected randomly from those depicting product (i.e., that are not simply blank). For each such reference image, each of various image excerpt locations is trialed with each combination of perspective correction factors. (The perspective correction factors can be at discrete values, such as 0, 10, 20, 30, 40, and 50 degrees of tilt correction, and 0, 45, 90, 135, 180, 225, 270, and 315 degrees of bearing correction). Each set of processing parameters will lead to successful decoding of indicia from some number of the reference images (or, sometimes, none).

A set cover strategy is desirably used. In particular, the set of processing parameters that led to successful decoding of the largest number of reference images is placed at a first position in the ordered list. Those successfully-decoded reference images are then removed from consideration, and the decoding results are examined to identify the set of processing parameters that led to decoding of the largest number of the images that remain in the reference set. This set of processing parameters is placed at the second position in the ordered list. Again, the reference images that were successfully decoded using this second set of processing parameters are removed from the reference set. The decoding results are then examined to identify the set of processing parameters that led to successful decoding of the largest number of frames in the remaining reference set. These parameters are entered at the third position in the listing, and the set of reference images is reduced accordingly. This process can continue until each set of processing parameters is assigned a position in the ranked listing.

It will be recognized that this method allows behavior of a scanning system to be optimized to particular operators, who may have different habits of presenting products to the cameras. These different habits will cause different sets of processing parameters to be preferred in decoding. When a new checker signs-on to a point of sale terminal, the ranked listing of processing parameters for that checker is loaded into memory and used for that checker's shift. The same approach can be used for individual shoppers, who are identified at the start of a self-checkout transaction, e.g., by a store loyalty card.

The ordering of processing parameters in the list can evolve. The system can compile a set of reference images during normal operations (e.g., at moments when processing resources are otherwise idle, such as when waiting for customer payment action), to determine which order of parameter application yields the best frame-decoding coverage, currently. If bottles of soda are on sale for a quarter each, and their number spikes at the checkout registers, then the parameter listing can adapt to rank more highly those parameters that seem to work best with a soda bottle-rich mix of products. If a checker reports to work one day with an adhesive bandage on a finger, and that bandage causes the checker to change the way they handle products (e.g., gripping cans by their sides instead of their tops), then the order in which decoding parameters are tried can adapt to reflect the changed statistical breakdown of product poses.

The foregoing and other features and advantages of the present technology will be more readily apparent from the following detailed description, which proceeds with reference to the accompanying drawings.

BRIEF DESCRIPTION OF THE DRAWINGS

FIG. 4 shows an example of three-faceted imagery captured by the tower camera system of the FIG. 1 scanner.

FIG. 5 shows an example of three-faceted imagery captured by the platter camera system of the FIG. 1 scanner.

FIGS. 6A, 6B and 6C show how a product may be presented to the FIG. 1 scanner with different degrees of tilt.

FIGS. 7A, 7B, and 7C show how a product may be presented to the FIG. 1 scanner at different bearings.

FIG. 11 graphically illustrates that certain sets of parameters yield image blocks that are watermark-decodable for some frames of reference imagery, and not others.

FIG. 12A presents data from FIG. 11 in tabular form.

FIG. 12B is like FIG. 12A, but sorted by the number of reference frames from which decodable blocks are derived, using different parameter sets.

FIG. 12C shows that by picking the three top-ranked parameter sets from FIG. 12B, five of the reference frames can be successfully watermark-decoded.

FIG. 13A shows that application of the first set of parameters yields watermark-decodable blocks from reference frames 1, 3, 4 and 6—leaving frames 2, 5, 7 and 8 still to be decoded, and showing that parameter sets 3 and 4 will each decode two of those remaining four frames.

FIG. 13B shows that application of the first and third set of parameters yields watermark-decodable blocks from reference frames 1-4, 6 and 8—leaving frames 5 and 7 still to be decoded, and showing that parameter set 4 will decode one of those remaining two frames.

FIG. 13C shows that application of the first, third and fourth sets of parameters yields watermark-decodable blocks from all reference frames except frame 5.

FIG. 13D shows that the first, third and fourth sets of parameters "cover" seven of the eight reference frames.

FIG. 14A shows top-ranked parameter sets, from an analysis of 710 reference tower camera images.

FIG. 14B shows top-ranked parameter sets, from an analysis of 753 reference platter camera images.

FIGS. 15A and 15B are like FIGS. 14A and 14B, but showing additional factors of flip, scale, and camera model parameters for the top-ranked blocks.

DETAILED DESCRIPTION

For expository convenience, this description is focused on identification of products by decoding digital watermark data. However, it should be recognized that the same techniques are equally applicable to extraction of product identifying data otherwise, such as by barcode decoding, optical character recognition, or by image fingerprint extraction/matching.

Figure 1:
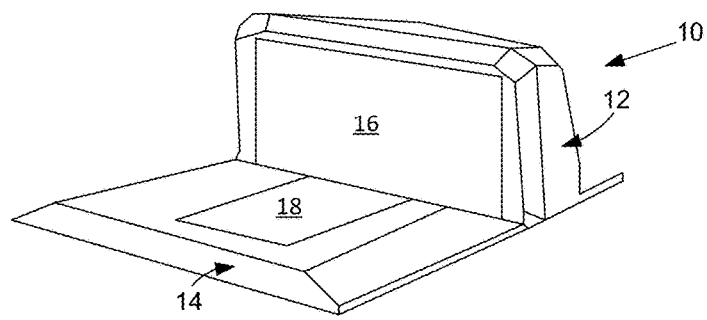
FIG. 1 shows an exemplary prior art camera scanner system.

Referring to FIG. 1, an illustrative retail scanner 10 includes a vertically-extending tower portion 12, and a horizontally-extending platter portion 14. Each portion includes a window 16, 18 through which one or more camera systems captures imagery of items presented for scanning.

Figure 2A:
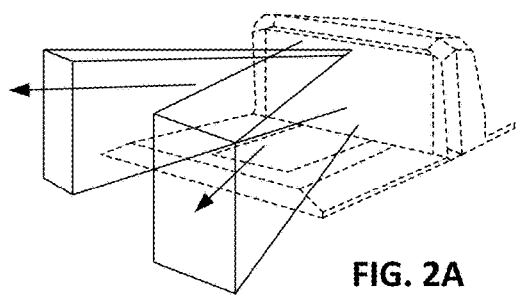
FIGS. 2A, 2B, 3A and 3B show different viewpoints that may be captured by the scanner system of FIG. 1.

In the FIG. 1 scanner, an arrangement of mirrors projects several different views of the retail product onto different parts of a camera sensor in the tower portion. Likewise for the platter portion. In particular, the optics arrangement in the tower captures two views looking out horizontally from the mid-height of the window 16, at angles of roughly +/−45 degrees. These two view axes cross each other over the platter window 18, so as to capture two different views of an object placed on window 18. This is illustrated in FIG. 2A.

Figure 2B:
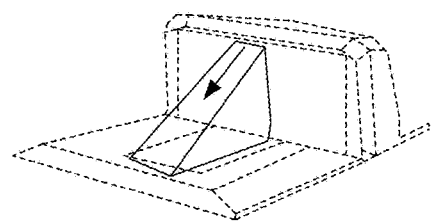

Another mirror arrangement provides a third viewpoint, looking down, at an angle of roughly 45 degrees, from near the top of the tower window 16. This is illustrated in FIG. 2B.

The three views, as projected onto the tower image sensor, are termed "facets."

Figure 3A:
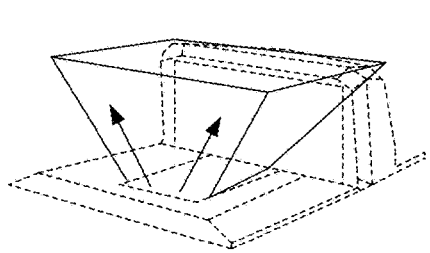
Figure 3B:
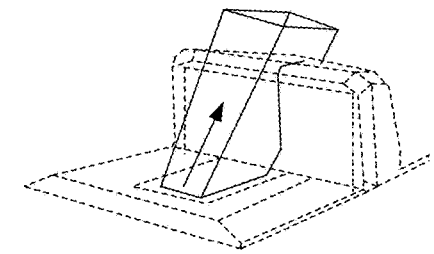

A similar mirror arrangement is employed in the platter portion 14. Two views look up from the window 18 at angles of roughly +/−45 degrees. (Unlike the tower case, these two fields of view don't cross each other.) A third image is also captured by the platter camera sensor, looking up at a roughly 45 degree angle towards the tower. These views are illustrated in FIGS. 3A and 3B.

The projection of three different views onto a common image sensor in the tower portion, and the similar projection of three different views onto a common image sensor in the platter portion, yields composite imagery of the sort shown in FIGS. 4 and 5, respectively. (The center facet of FIG. 4 is void of product imagery because the product (a two liter drink bottle) was positioned a sufficient distance away from the tower window 16 that the downward-looking FIG. 2B view did not capture any of the product in its field of view.)

When a retail checker (or a shopper, in the case of self-checkout) passes a product in front of the FIG. 1 scanner, the product may have an arbitrary presentation. Rarely is it square to the cameras, i.e., with the principle product axis vertical, and a face of the product parallel to the tower window. Yet such a square presentation often yields the best product recognition (whether by barcode, digital watermark, or image fingerprinting).

The non-square presentation of a product to the scanner can be characterized by a set of angles. One angle is termed "tilt," and refers to inclination of a top of the product within a plane perpendicular to the tower. FIGS. 6A, 6B and 6C show a product at tilts of 0, 25 and 45 degrees, respectively.

A second angle is termed "bearing," and refers to rotation of the product around an axis extending up from the platter 14. FIGS. 7A, 7B and 7C show a product at bearings of 0, 25 and 45 degrees, respectively.

(While the figures illustrate only positive angles, it will be recognized that negative angles are possible as well.)

Figure 8:
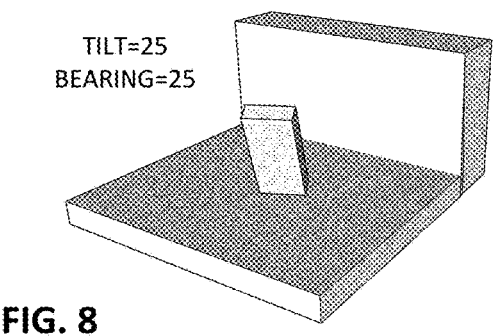
FIG. 8 shows how a product may be presented to the FIG. 1 scanner at a pose that includes both non-zero tilt and bearing.

Poses involving combinations of tilt are bearing are common. FIG. 8 shows a product posed with a tilt of 25 degrees, and a bearing of 25 degrees.

(It will be recognized that a product's pose may also include a third angle: rotation around the axis extending horizontally from the tower. However, most decoding processes are robust to variations in this third angle, so it is disregarded in the preferred embodiment.)

Before attempting product recognition, it is often useful to process at least some of the camera imagery to try and virtually re-pose the depiction of the product in the image, so that the product is presented at a virtual pose that is favorable to decoding. For example, the imagery may be processed to counteract some of the perspective distortion introduced by the tilt and bearing angles of the product's physical pose.

Because the tower and platter cameras each outputs a composite image including three facets, each with a different viewpoint, it is expedient to perform such correction on different patches of images, selected from different locations in the captured image frame Unfortunately, the tilt and bearing angles of a product's pose are not known in advance. To cope with this ignorance, the scanner may try a variety of rote counter-distortions on a variety of image patches (as many as the time budget permits), and attempt to decode each counter-distorted image patch.

As noted, however, there may be hundreds of candidate counter-distortions to be tried, and the time budget (e.g., 16.6 milliseconds) does not permit all to be attempted. One aspect of the present technology concerns a method for developing a prioritized listing of candidate patches and associated counter-distortions, ranked to make improved use of the limited processing time that is available.

Figure 9:
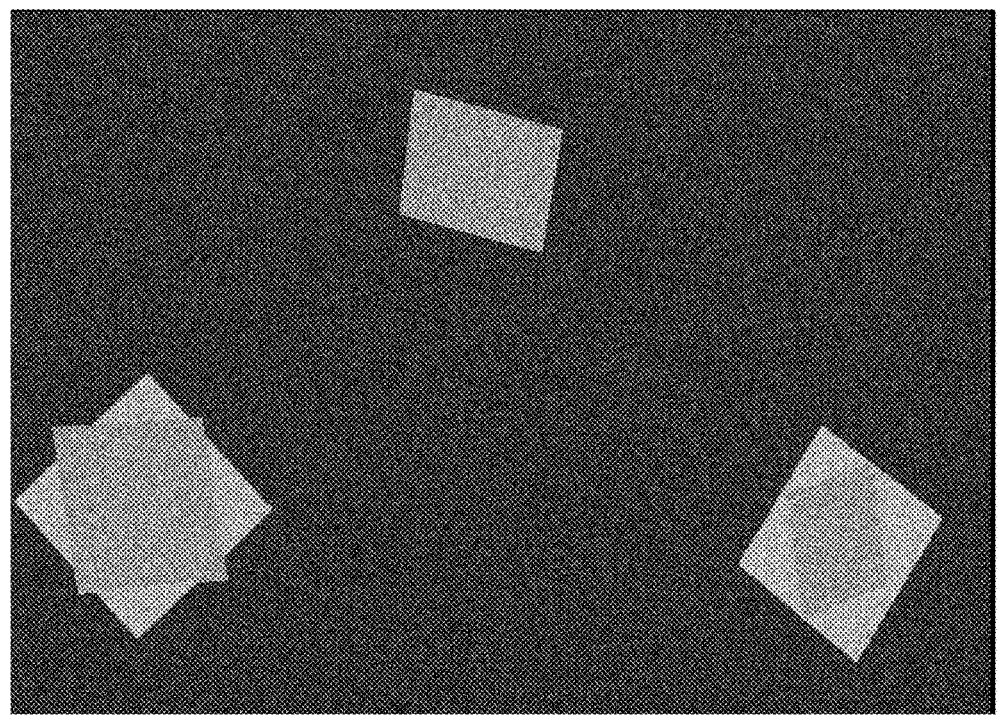
FIG. 9 shows five locations within a frame of captured tower imagery, from which watermark-decodable blocks may be excerpted, remapped into 128×128 pixel blocks, and analyzed to attempt product identification, employing principles of the present technology.

The method is detailed further below, but FIG. 9 illustrates an aspect of the result—the identification of five (in this case) different patches from a frame of captured imagery. These are the five "best chances" the scanner has of detecting a watermark from a frame of imagery within the limited time allotted. Each patch corresponds to one of nine target locations within the image frame, shown in FIG. 10. For each of the quadrilateral patches in FIG. 9, the processor excerpts the pixels, and applies a counter-transformation to yield a 128×128 pixel square block. The block is then submitted to a watermark decoder to attempt to extract identification information.

Each of the five quadrilaterals in FIG. 9 is characterized by a set of parameters including (a) location within the frame (i.e., one of nine locations, shown in FIG. 10, which may be identified by pixel coordinates of their centers), and (b) tilt/bearing values.

To discover the five (or other small number) of parameter sets that are best tried in the limited time available, a computer system according to the present technology examines a large set of images captured by the scanner, e.g., in the hundreds or thousands, and determines which excerpt locations—and which pose counter-distortions—produce image blocks from which the decoder can most commonly decode watermark data.

Operation begins with a geometrical exercise. In particular, for a first of the nine locations shown in FIG. 10, the method determines the quadrilateral pixel excerpt that would correspond to a square region on a product, centered at that location in the frame, if the product were viewed by the tower camera and the product were physically posed with tilt/bearing of {0,0}. It then does likewise for product poses at tilt/bearings of {10,0}, {20,0}, {30,0}, {40,0} and {50,0}. It then repeats the process with a bearing of 45 degrees—again considering poses at each of the tilt values (e.g., 0, 10 . . . 50). It then repeats the process with bearings of 90, 135, 180, 225, 270, and 315 degrees.

Figure 10:
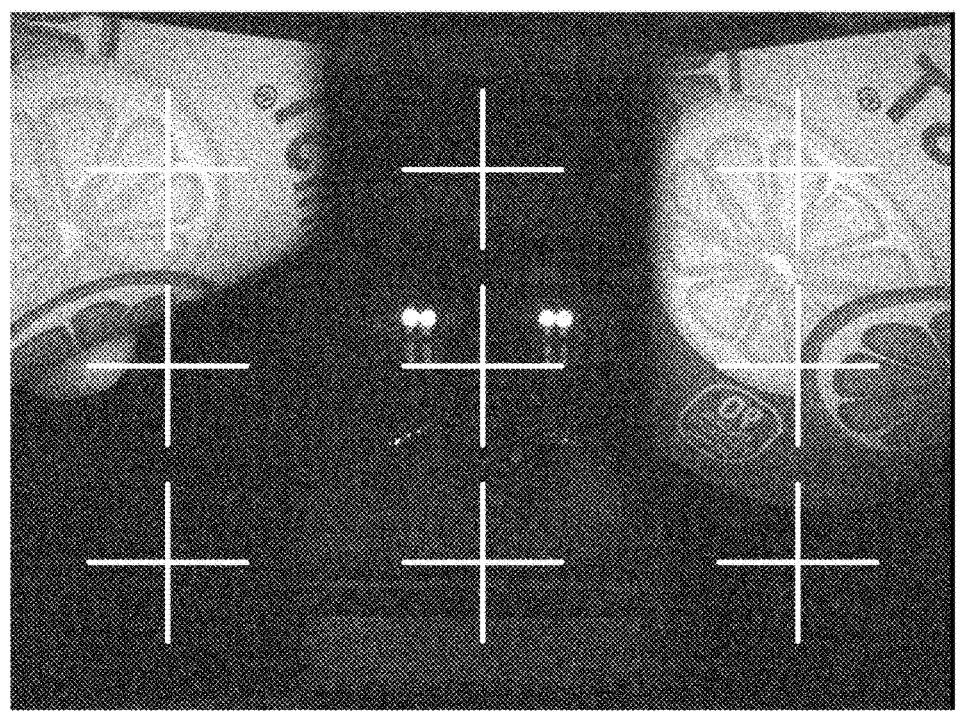
FIG. 10 shows nine different locations within a frame of captured imagery from which pixels can be excerpted and processed for submission to a watermark detector.

And it then repeats all that for each of the other eight locations in FIG. 10.

While FIG. 9 shows five candidate image excerpts, the exhaustive analysis identifies 48 different image excerpts (corresponding to the 48 different pose combinations) for each of the nine different target locations within an image frame, or 432 candidate quadrilaterals The system then repeats this exercise for the platter camera, yielding 432 different candidate quadrilaterals.

Processing of the reference imagery then begins. In one arrangement, the reference imagery includes 710 images from the tower camera, and 753 images from the platter camera.

For a first frame of reference imagery, the system extracts each of the 48 different above-determined quadrilateral excerpts around each of the nine FIG. 10 locations, and applies a counter-distortion to restore the excerpt to a square block, 128 pixels on a side. Each such square block is submitted to a watermark decoder, which succeeds in detecting a watermark payload, or not. For each frame, there are thus 432 results, indicating whether a watermark was successfully decoded from a block characterized by a particular location and tilt/bearing, or not. This analysis is repeated for each frame of imagery in the reference set.

Statistics are collected, indicating—for each candidate set of parameters (i.e., excerpt location, tilt/bearing)—which image frames were successfully decoded. Exemplary statistics are shown, in graphical form, in FIG. 11, with lines indicating which frames were successfully decoded through application of which sets of parameters. In particular, Parameter Set 1 yielded blocks from frames 1, 3, 4, and 6 that were successfully decoded. Parameter Set 2 produced decodable blocks from frames 3, 4 and 6. Parameter Set 3 led to successful watermark extraction from frames 2 and 8. Etc.

These statistics are presented in tabular form in FIG. 12A. Of the eight reference frames considered, Parameter Set 1 successfully decoded four of them. Parameter Sets 2, 3, 4 and 5 respectively decoded three, two, two, and four of the reference frames.

These results can be re-ordered based on the number of frames decoded. FIG. 12B shows such a listing in descending order. Parameter Sets 1 and 5 lead the table with four frames decoded, followed by Parameter Set 2 (three frames), Parameter Set 3 (two frames), and Parameter Set 4 (two frames). This ordering can define the ordering by which different parameter sets are tried.

If the time budget allows only three parameter sets to be tried in decoding a watermark from an incoming image frame, one approach is to apply the three top-ranked parameter sets from FIG. 12B, i.e., Parameter Sets 1, 5 and 2. FIG. 12C shows the frames decoded by these top-three parameter sets. Five of the eight frames are successfully decoded.

On further reflection, applicant realized that the FIG. 12C selection of parameter sets leaves room for improvement, by application of set cover principles. The set cover problem is a classical question in combinatorics, computer science and complexity theory.

Wikipedia gives the following introduction: Given a set of elements {1, 2, . . . m} (called the universe), and a set S of n sets whose union equals the universe, the set cover problem is to identify the smallest subset of S whose union equals the universe. For example, consider the universe U={1,2,3,4,5} and the set of sets {{1,2,3}, {2,4}, {3,4}, {4,5}}. Clearly the union of S is U. However, we can cover all of the elements with the following, smaller number of sets: {1,2,3} and {4,5}.

In the present context, we have no assurance that all the frames in the reference set will be decoded using one or more of the parameter sets. (This is illustrated by FIG. 11; Frame 5 cannot be decoded by any of the illustrated Parameter Sets.) So the premise of the set cover problem may not be met. Nonetheless, a similar notion is employed. We want to identify a selection of parameter sets that yields a better decoding coverage of the reference frames, than the selection chosen in FIG. 12C.

We do this by the arrangement shown in FIGS. 13A-13D. As a heuristic, we select the parameter set that successfully decoded the largest number of frames, and put that parameter set at a first position in a ranked ordering of candidates. In the present example, this is Parameter Set 1, which successfully decoded image frames 1, 3, 4, and 6.

FIG. 13A shows, in cross-hatching, the image frames that were successfully decoded through use of Parameter Set 1. They are removed from consideration. Since they were successfully decoded by Parameter Set 1, we are not interested in decoding those images again; they become moot.

What is important is the diminished set of reference images—after frames 1, 3, 4 and 6 are removed. FIG. 13A shows—in the right-most column, the number of frames in the diminished reference set that can be decoded by the remaining parameter sets. As can be seen, parameter sets 3 and 4 can each decode two of the remaining reference images.

In the case of a tie, we pick one of these parameter sets (#3 in this instance) that can decode the greatest number of the remaining reference images, and add it to our ordered listing of candidate parameter sets. Since Parameter Set 3 successfully decoded image frames 2 and 8, we remove these frames from the reference set—shown by cross-hatching in FIG. 13B. Only image frames 5 and 7 now remain in the reference set. The right-most column of FIG. 13B shows the number of frames in the twice-diminished reference set that can be decoded by application of each of the remaining parameter sets. Parameter Set 4 can decode one of the remaining images; Parameter Sets 2 and 5 can decode none.

Parameter Set 4 is chosen as the third parameter set for the ordered listing of candidates, since it can decode the greatest number of images remaining in the (now-twice-diminished) reference set. FIG. 13C shows, in cross-hatch, the image frames that are decoded by the first three entries in the candidate parameter list. Only frame 5 remains to be decoded. However, none of the remaining parameter sets (2 and 5) is able to decode frame 5.

FIG. 13D summarizes the selection results. By applying parameter sets 1, 3 and 4, seven of the original reference frame are decoded. This compares with five frames using the process discussed earlier, and summarized in FIG. 12C.

A similar result follows in actual practice. Identifying three blocks using the FIGS. 12A-12C approach (which may be termed "count-based ordering"), allowed decoding of 138 of the 710 reference tower images, and 79 of the reference platter images. In contrast, identifying three blocks using the FIGS. 13A-13D approach (which may be termed "set cover-based ordering"), allowed decoding of 177 of the reference tower images, and 105 images of the reference platter images—increases of 28% and 33%, respectively.

Note that the detailed heuristic—of adding, to the ordered list, the parameter set that decodes the maximum number of frames remaining in the reference set—is not guaranteed to be optimum. It may leave, uncovered, one or more frames of imagery that would have been covered had a different heuristic been employed.

As a different heuristic, consider a strategy based on "second-best." That is, a variant strategy adds to the ordered list the parameter set that decodes the second-to-maximum number of frames remaining in the reference set. If the time-budgeted number of decoding trials is known (e.g., 3 or 5), then the final entry in the ordered list (i.e., #3 or 5) can be the parameter set that decodes the maximum number of frames then-remaining in the reference set.

To optimize coverage, an analysis of alternative lists can be conducted. Consider an arrangement in which time permits 3 parameter sets to be tried. If the universe of possible parameter sets is 432 (as in the situation discussed above), then the number of possible different groups of 3 that can be drawn from this universe is $$432!/(3!(432-3)!)$$

or, in our example, 13,343,760 combinations.

The coverage of each of individual parameter set—in terms of decoded images—is known from the testing, discussed above. (E.g., Parameter Set 1 decoded images 1, 3, 4, 6 . . . , etc.) These coverages can be combined, in accordance with each of the possible 13 million triples, to determine the aggregate coverage that would be provided by each triple. The triple that covers, in the aggregate, the greatest number of images from the reference set can be selected, and it will be optimum.

However, time may not allow for such exhaustive analysis. Another alternative is to consider all combinations of triples drawn from a sub-set of top-scoring parameter sets. The top-scoring parameter sets may be identified by ranking the parameter sets by the number of images they respectively decode. (Such an ordered listing is provided, e.g., in FIG. 12B.) Just the top-tier of parameter sets may be considered, such as the top ten or twenty, or the top 5% or 10%. The number of candidates for consideration may be chosen to be a multiple of the number of tries that will ultimately be employed in practice (i.e., will fit within the allotted processing time). For example, if time permits three decoding attempts, then the top tier that is exhaustively analyzed may be five or ten times this number, i.e., the top 15 or 30 parameter sets in the ranked list.

If the twenty top-ranked parameter sets are considered, the number of possible triples falls to:

$$20!/(3!(20-3)!)$$

or 1140 combinations. Such number is more tractable than the 13 million discussed above. Yet to a high degree of certainty, the optimum solution will be included among these 1140 combinations.

Again, the aggregate image coverage for each of these 1140 triples is determined. The triple that covers, in aggregate, the largest number of reference images (i.e., yields a block from which a watermark payload is successfully decoded) serves as the ranked list of three parameter sets for use in on-going product identification.

Still another variant weights different parameter sets based on their computational cost. A first parameter set that covers a large number of frames may be passed-over for entry in the ordered list used in normal operation, in favor of two parameters sets that each covers a smaller numbers of frames, because the latter two parameter sets involve less aggregate processing time than the first parameter set. Relatedly, if the system has already performed some calculation(s) in connection with one parameter set—the results from which might be re-used in connection with a second parameter set—then this second parameter set might be chosen over another with slightly more coverage, simply because the second parameters can be applied at lower computational cost. In the case of a tie (i.e., two parameter sets covering the same number of images), the parameter set that involves less computation may be chosen—breaking the tie.

Although the detailed arrangement considered six different tilt values (0, 10, . . . 50 degrees), in actual practice applicant considers a few others in addition.

When a cereal box or other product is positioned with a "square" pose on the scanner, and is imaged by the tower camera, none of the three viewing axes is orthogonal to the face of the product. As a consequence, a product that is "square" on the scanner, does not appear square in any of the three facets of captured imagery. Each of the three component "square" views is instead captured with a baseline tilt value that is caused by a projection of the angle at which the viewing axis intersects the "square" product. (That is, a square region on the product artwork is imaged as a non-square quadrilateral in the captured image frame.) In the preferred embodiment, these baseline tilts are measured, and are treated as alternative tilts that can be applied when considering candidate geometrical corrections. So the set of candidate tilts expands from six to nine.

Likewise with bearings. While the above discussion detailed eight alternative bearings that can be considered (0, 45, 90, 135, 180, 225, 270, and 315 degrees), in the preferred embodiment, applicant considers three more. These are the bearing values that are introduced into the three facets of tower imagery captured from a product posed squarely on the scanner, due to a projection of the angle at which the viewing axis intersects the product. So in total, eleven different bearings are considered.

The number of combinations of tilts and bearings is thus 9*11, or 99, as opposed to the 48 parameter sets referenced above. Likewise, the total number of differently-compensated image excerpts that may be derived from a single tower image frame is not 432, but 8*99, or 792.

FIG. 14A is like FIG. 12B, showing a ranked list of decoding results. But FIG. 14A is from the actual test of 710 tower camera reference frames. The top line shows that 87 of the 710 frames were successfully watermark-decoded by processing a quadrilateral at pixel location (576,220), based on a tilt of 40 degrees, and a bearing of 270 degrees.

The second-best result was the decoding of 62 image frames using an excerpt at pixel location (64,224), based on a tilt of 10 degrees and a bearing of 180 degrees.

Interestingly, the third-most-successful result was an image excerpt at the same pixel location as the second-most-successful result, i.e., (64,224). This third-most-successful result employed a tilt of −33.5 degrees (one of the "square" values discussed above), and a bearing of 270 degrees.

FIG. 14B is similar, but for the platter camera.

While the discussion to this point has focused on parameter sets comprised just of excerpt location and tilt/bearing, other factors may be considered as well.

One is image reversal. Sometimes a block will be successfully decoded when it is flipped left-for-right, when it wouldn't decode in its native state. Thus, flip-state is a further factor. (It will be recognized that such flipping is different than simply rotating a patch by 180 degrees.)

Taking this further factor into account, there are not 792 blocks to evaluate per reference image, but rather 792*2, or 1584.

Another factor involves image scale. The depicted size of a product in tower imagery depends on the distance from the product to the tower glass. If the product is closer, it will appear larger.

Sometimes, different decoding results are obtained by changing the scale of an image excerpt before submitting it to the decoder. For example, a product's depiction can be made half as large by down-sampling by a factor of two. Thus, a 256×256 pixel excerpt can be used as the basis for the 128×128 pixel block submitted to the decoder.

If imagery is processed both at its original scale, and also down-sampled by a factor of two, then this again doubles the number of candidate blocks that can be derived from each frame of imagery, from 1584 to 3168.

Still another factor involves correction based on camera model.

If a square product is presented with its face orthogonal to the viewing (lens) axis of a camera, then the face will be depicted as a square regardless of the type of camera used (disregarding lens distortion).

However, if a square item is inclined with its top edge away from the camera, the more distant part of the object (i.e., the top edge) will be depicted as receding in the camera's view, with a shortened length. The item is thus depicted as an isosceles trapezoid (assuming the top edge of the item is perpendicular to the lens axis). The degree of foreshortening (i.e., the amount by which the depicted length of the top edge of the item is shorter than the bottom edge) depends on the camera model. (In a camera with a telephoto lens, a smaller degree of foreshortening will result than in a camera with a wide angle lens.)

The illustrative tower camera has a single sensor, but may be regarded as actually comprising three cameras—each with a different optic path to the common sensor. Each of these cameras has a different camera model.

A simple camera model is characterized by focal length and principal point data. Focal length of a retail scanner camera system can be estimated experimentally, using a checkerboard reference target. The analysis yields two data—one a focal length for "x," and one a focal length for "y." (Most retail scanner camera systems are found to have relatively long focal lengths, i.e., behaving as telephoto lenses.)

The principal point data also can be experimentally determined, and again comprises two data, one for "x" and one for "y." (The principal point is the location in the image plane intersected by the principal axis of the lens system.)

Each of the three facets of imagery captured by the tower camera system is characterized by a different set of focal length/principal point data, and is desirably corrected to account for perspective distortion due to the camera model.

It would seem that correction of left facet imagery from the tower sensor, with perspective correction factors associated with one of the sensors' two other facets, would not be productive. However, in fact, sometimes it is.

FIG. 15A is similar to FIG. 14A, but is expanded to include the above-discussed factors of scale, flip, and camera model correction factors. The right-most column shows the camera model parameters associated with the top-ranked results. It will be recognized that there are three different sets (i.e., although FIG. 15A shows several rows, only three different parameter model data are included). In the second and third lines, involving an excerpt taken from the left image pane (pixel location 64,224), it will be seen that two different sets of camera model parameters were found to be advantageous.

FIG. 15B is similar, but for the platter camera.

By considering three different camera models for each excerpt of imagery, the number of blocks to evaluate per reference image triples, from 3168 to 9504. Thus, when considering the tower reference set of 710 images, a total of 6.7 million individual block results were considered in gathering the results of FIGS. 15A and 15B.

It was earlier noted that the pose at which a product is presented to the scanner is unknown. While initially true, pose is often gleaned by processing.

One case is where a captured image includes a barcode indicia. In one embodiment, scanner hardware allocates a first portion of its available image processing time to barcode decoding, and a subsequent portion of its available time to watermark decoding. During the former operation, if the scanner identifies a barcode, the appearance of the barcode in the image frame permits the pose of that face of the product to be determined. It may reveal, for example, that the product face is oriented with a tilt angle of 26 degrees, and a bearing angle of 30 degrees, relative to the camera viewing axis.

Such pose information discerned from barcode analysis can be employed in the subsequent watermark-decoding phase of operation. For example, the ranked list of candidate image excerpts, and tilt/bearing parameters, can be augmented to include one more entry (which may be processed first in the ranked order). This additional parameter set can identify a block at the location in the image at which the barcode was located (or at the nearest of the nine locations shown in FIG. 10), with the barcode-discerned tilt and bearing values. Since a product face, at a particular orientation, at a particular location, is known to exist in the image, then such information merits consideration in the watermark analysis.

In other embodiments, watermark decoding may be performed first. The successful extraction of a watermark payload involves, as part of the process, sleuthing the accurate pose of the watermarked excerpt. Again, such information about a particular pose of part of a product, at a particular location within the imagery, can help inform the subsequent barcode decoding process. For example, imagery around that location can be compensated for the noted tilt/bearing, before providing to the barcode detector, to facilitate its task.

It will be recognized that one application of the present technology is to define a ranked list of candidate blocks for watermark evaluation (by analysis of a corpus of reference data), and to program a scanner to thereafter prioritize blocks for decoding based on this list. The order may be fixed, for the life of the scanner.

Another application of the technology is a scanner that learns, by analyzing image data it has captured, in an attempt to always improve its operation. Such a scanner can archive the most recent few-hundred or -thousand images, and analyze them when processing resources are available, to discern which blocks seem to be the best recent choices. "Best" may vary depending on the identity of the scanner operator, how long the operator has been on-shift (habits of product handling may vary, e.g., as the operator grows tired toward the end of shift), the mix of products, ambient lighting, etc.

From the foregoing, it will be recognized that the present technology represents an improvement to the computer technology used in retail checkout, allowing a scanner's limited processing ability to be applied more effectively to the task of product identification. Additionally, the technology benefits consumers, since a checker's need to re-scan items (which weren't identified on a first pass through the scanner) is reduced.

Concluding Remarks

Having described and illustrated the principles of the technology with reference to illustrative embodiments, it will be recognized that the technology is not so-limited.

For example, while the technology was described in the context of a fixed point of sale scanner, which captures multiple product views, the technology is likewise suited for use with other scanners—including those that capture just a single product view, and those that are handheld rather than fixed. The technology is also useful in smartphone-based watermark readers, such as the Digimarc Discover app. (Digimarc Discover technology is further detailed in applicant's patent documents publications 20110212717, 20110161076, 20120208592, 20130311329, and 20140357312

While the detailed embodiment considered both tilt and bearing angles, other embodiments can consider just one or the other.

Some embodiments of the technology may process multiple image blocks simultaneously (e.g., through use of multiple core hardware, or a GPU). Other embodiments serially process one block at a time.

If payload data is successfully extracted from a block, some embodiments stop with this positive result. Other embodiments continue, examining other blocks on the ranked list to try and identify further blocks. (So-doing may succeed in identifying two different products in a single frame of imagery, or may simply serve as a confirmatory identification.)

Some embodiments step through blocks on the ranked list until a counter times-out (signaling the end of an allotted time period), or until a next image needing processing is received. Other embodiments examine a fixed number of blocks—even if time is thereafter available during which one or more additional blocks might have been tried.

The above-described arrangements can be combined with other technologies detailed in the cited documents, to beneficial effect. For example, certain of the documents detail block selection approaches which are based on image attributes, e.g., luminance, texture, etc. The above-described arrangements, in contrast, may be regarded as blind. That is, the contents of a frame provided from the camera need not be considered in choosing blocks for decoding. Instead, the choice of blocks to decode in a new image is based on results derived from a collection of earlier images. However, the two approaches can be advantageously combined.

For example, a ranked list of candidate blocks can be identified as detailed above. These blocks are then screened, per the content-based selection approach, for blocks that look most promising. If the block corresponding to the first set of parameters on the ranked list is found to be, e.g., of low luminance or low contrast, it can be disregarded without further investment of processing time. Instead, processing immediately turns to the block corresponding to the second set of parameters on the ranked list. Again, it is screened by one or more other criteria to determine whether full analysis is warranted. And so on, until the time budget for processing the frame has elapsed.

While the detailed embodiment considered nine patch locations per camera image (i.e., three patch locations per facet), a greater or lesser number can be used. If six patch locations are used per facet, then applicant's trials of 710 tower images and 753 platter images shows still greater improvements. In particular, changing from the approach shown in FIGS. 12A-12C, to the approach shown in FIGS. 13A-13D, led to a 30% increase in the number of decodable tower reference images, and a 61% increase in the number of decodable platter reference images.

(Although the specification most particularly considered tower imagery, it will be understood that the same arrangements are likewise employed for platter imagery.)

While the product pose is characterized in terms of tilt and bearing angles, it will be recognized that pose can be represented in a variety of different coordinate systems, with a variety of different parameters.

Homography, image correction for camera model parameters, and correction for perspective geometry, are presumed to be within the capability of the artisan. (An introduction to camera models is attached to the provisional priority application, by way of background for other readers. The casual reader is likewise referred to the Wikipedia article for homography.) The artisan is likewise presumed to be familiar with digital watermarking. Applicant's patent disclosures concerning watermarking, and other relevant technologies, include documents U.S. Pat. Nos. 6,590,996, 7,013,021, 20140119593, 20140112524, 20140052555, 20120078989, 20100150434, and pending application Ser. No. 14/725,399, filed May 29, 2015, Ser. No. 14/724,729, filed May 28, 2015, and Ser. No. 14/842,575, filed Sep. 1, 2015. These documents are incorporated herein by reference. The artisan is likewise presumed to be familiar with fingerprint-based object identification. SIFT, SURF, ORB and CONGAS are some of the most popular algorithms. (SIFT, SURF and ORB are each implemented in the popular OpenCV software library, e.g., version 2.3.1. CONGAS is detailed, e.g., in Neven et al, "Image Recognition with an Adiabatic Quantum Computer I. Mapping to Quadratic Unconstrained Binary Optimization," Arxiv preprint arXiv:0804.4457, 2008.) Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision—ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

The design of computing devices referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

Scanners are comprised of many of these same elements, with the addition of one or more illumination sources, optical sensors, and associated optics. A weigh scale may also be provided.

The processes and system components detailed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nVidia Tegra 4. Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

As noted, implementation can employ special purpose electronic circuitry that has been custom-designed and manufactured to perform some or all of the component acts, as an application specific integrated circuit (ASIC).

To realize such an implementation, the relevant module(s) (e.g., image excerpting, tilt/bearing correction, camera model correction, watermark decoding) are first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Essentially all of the functions detailed above can be implemented in such fashion. However, because the resulting circuit is typically not changeable, such implementation is best used for component functions that are unlikely to be revised.

Information on implementations of such technology in hardware-adaptable form is provided in above-referenced application Ser. No. 14/842,575.

As indicated above, reference to a "module" that performs a certain function should be understood to encompass one or more items of software, and/or one or more hardware circuits—such as an ASIC as just-described.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Although the detailed embodiment contemplated that the processing—both of reference imagery, and of images as they are produced by a scanner during retail checkout—is performed by a processor in the scanner, this need not be the case. In other embodiments, such processing can be performed by a processor in an associated point of sale terminal, by a processor in a store's central computer, by a processor at a remote location (e.g., the "cloud"), or distributed among such processors.

In like fashion, description of data being stored on a particular device is also exemplary; data can be stored anywhere: local device, remote device, in the cloud, distributed, etc.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

The invention claimed is:

1. A method of enhancing operation of a visual recognition system that is allotted a limited time interval to produce an identification result, which system includes a camera that provides image frames for extraction of digital watermark data therefrom, the method comprising the acts:

(a) for one sub-part of one image frame, applying at least M different values of tilt-angle correction in attempting to extract digital watermark data from M resultant tilt angle-corrected counterparts of said one sub-part of said one image frame, where M>1;

(b) performing act (a) at least N times, each with a differently-located sub-part of said one image frame, where N>1, wherein extraction of digital watermark data from said one image frame is attempted for at least M*N combinations of tilt angle correction values and sub-part locations;

(c) performing act (b) plural times, each with a different image frame drawn from a set P of image frames;

(d) determining which single combination of tilt angle correction value and sub-part location resulted in successful extraction of digital watermark data from a greatest number of said image frames in said set P; adding this combination of tilt angle correction value and sub-part location to a listing of decoding parameters; and removing, from the set P, those image frames from which digital watermark data was successfully extracted using said combination of tilt angle correction value and sub-part location; and (e) repeating act (d) one or more times with successively smaller sets P;

wherein the method yields a listing of decoding parameters that is ranked by likelihood of successfully extracting unique digital watermark data from an image frame, given the previous application of other decoding parameters in said listing, wherein attempts to extract digital watermark data from a new image can successively apply parameters from said ranked listing until said limited time interval elapses.

2. The method of claim 1 that further includes the acts:

capturing an image frame with said camera;

processing the captured image frame with a first set of parameters from said ranked listing, to yield a first processed image excerpt;

attempting to extract digital watermark data from said first processed image excerpt; and upon failure to successfully extract digital watermark data from said first processed image excerpt:

processing the captured image frame with a next set of parameters from said ranked listing, to yield a second processed image excerpt; and attempting to extract digital watermark data from said second processed image excerpt.

3. The method of claim 1 in which:

act (a) includes, for one sub-part of one image frame, applying at least M different values of tilt angle-correction, and for each such value, applying R different values of bearing-angle correction, in attempting to extract digital watermark data from M*R resultant tilt angle- and bearing angle-corrected counterparts of said one sub-part of said one image frame, where M>1 and R>1;

act (b) includes performing act (a) at least N times, each with a differently-located sub-part of said one image frame, where N>1, wherein extraction of digital watermark data from said one image frame is attempted for at least M*R*N combinations of tilt angle correction values, bearing angle correction values, and sub-part locations; and act (d) includes determining which single combination of tilt angle correction value, bearing angle correction value, and sub-part location resulted in successful extraction of digital watermark data from a greatest number of said image frames in said set P; adding this combination of tilt angle correction value, bearing angle correction value and sub-part location to a listing of decoding parameters; and removing, from the set P, those image frames from which digital watermark data was successfully extracted using said combination of tilt angle correction value, bearing angle correction value and sub-part location.

4. The method of claim 3 in which:

act (a) includes, for one sub-part of one image frame, applying at least M different values of tilt angle-correction, and for each such value of tilt angle-correction, applying R different values of bearing angle-correction, and for each such value of bearing angle-correction, applying S different values of camera model-correction, in attempting to extract digital watermark data from M*R*S resultant tilt angle-, bearing angle- and camera model-corrected counterparts of said one sub-part of said one image frame, where M>1, R>1 and S>1; and act (b) includes performing act (a) at least N times, each with a differently-located sub-part of said one image frame, where N>1, wherein extraction of digital watermark data from said one image frame is attempted for at least M*R*S*N combinations of tilt angle correction values, bearing angle correction values, and sub-part locations; and act (d) includes determining which single combination of tilt angle correction value, camera model values, and sub-part location resulted in successful extraction of digital watermark data from a greatest number of said image frames in said set P; adding this combination of tilt angle correction value, camera model values and sub-part location to a listing of decoding parameters; and removing, from the set P, those image frames from which digital watermark data was successfully extracted using said combination of tilt angle correction value, camera model values and sub-part location.

5. The method of claim 1 in which:

act (a) includes, for one sub-part of one image frame, applying at least M different values of tilt angle-correction, and for each such value of tilt angle-correction, applying S different values of camera model-correction, in attempting to extract digital watermark data from M*S resultant tilt angle- and camera model-corrected counterparts of said one sub-part of said one image frame, where M>1 and S>1;

act (b) includes performing act (a) at least N times, each with a differently-located sub-part of said one image frame, where N>1, wherein extraction of digital watermark data from said one image frame is attempted for at least M*S*N combinations of tilt angle correction values, bearing angle correction values, and sub-part locations.

6. A method employing a camera scanning system at a retail checkout, comprising the acts:

storing reference images captured by the camera scanning system, as a person operates the system by moving products past a window thereof;

determining, from analysis of plural of said stored reference images, a set cover-based list, the list comprising at least first and second sets of one or more watermark decoding parameters found useful in extracting digital watermark data from said reference images, so that said sets of watermark decoding parameters can be tried in extracting digital watermark data from future imagery produced by the scanning system;

the first set of watermark decoding parameters identifying a first patch of pixels to be examined in the future imagery digital watermark data;

the second set of watermark decoding parameters identifying a second patch of pixels to be examined in the future imagery for digital watermark data;

the first set of watermark decoding parameters including data specifying a location of said first patch of pixels in an image frame, a size of said first patch of pixels, a tilt of said first patch of pixels, and/or a bearing of said first patch of pixels;

the second set of watermark decoding parameters including data specifying a location of said second patch of pixels in an image frame, a size of said second patch of pixels, a tilt of said second patch of pixels, and/or a bearing of said second patch of pixels;

the first and second sets of watermark decoding parameters being different;

the first and second patches of pixels in an image frame being different, due to said first and second sets of watermark decoding parameters being different; and employing one or more of said first and second sets of watermark decoding parameters in attempting extraction of digital watermark data from scanning system imagery that is produced after said analysis.

7. The method of claim 6 that further includes:

storing said list in association with an identification of said person; and when, after a period of use by one or more other people, said person again operates a scanning system, recalling said stored list, and employing one or more of said plural sets of parameters in attempting extraction of product identifying information from scanning system imagery.

8. An apparatus comprising a hardware processor configured to operate on images captured by a camera scanning system, by performing acts including:

storing reference images captured by the camera scanning system;

determining, from analysis of plural of said stored reference images, a set cover-based list, the list comprising at least first and second sets of one or more watermark decoding parameters found useful in extracting digital watermark data from said reference images, so that said sets of watermark decoding parameters can be tried in extracting digital watermark data from future imagery produced by the scanning system;

the first set of watermark decoding parameters identifying a first patch of pixels to be examined in the future imagery digital watermark data;

the second set of watermark decoding parameters identifying a second patch of pixels to be examined in the future imagery for digital watermark data;

the first set of watermark decoding parameters including data specifying a location of said first patch of pixels in an image frame, a size of said first patch of pixels, a tilt of said first patch of pixels, and/or a bearing of said first patch of pixels;

the second set of watermark decoding parameters including data specifying a location of said second patch of pixels in an image frame, a size of said second patch of pixels, a tilt of said second patch of pixels, and/or a bearing of said second patch of pixels;

the first and second sets of watermark decoding parameters being different;

the first and second patches of imagery being different, due to said first and second sets of watermark decoding parameters being different; and employing one or more of said first and second sets of watermark decoding parameters in attempting extraction of digital watermark data from scanning system imagery that is produced after said analysis.

\* \* \* \* \*